United States Patent [19]

Kramer

[11] 4,163,564

[45] Aug. 7, 1979

[54] SHOPPING CART SKIS

[76] Inventor: Walter Kramer, 1519 W. Henderson, Chicago, Ill. 60657

[21] Appl. No.: 855,293

[22] Filed: Nov. 28, 1977

[51] Int. Cl.² .............................................. B62B 13/18
[52] U.S. Cl. ........................................ 280/10; 280/11
[58] Field of Search ................................. 280/9, 10, 11

[56] References Cited

U.S. PATENT DOCUMENTS

| | | | |
|---|---|---|---|
| 800,720 | 10/1905 | Closson | 280/11 |
| 2,480,256 | 8/1949 | Nurenberg | 280/9 |
| 3,851,891 | 12/1974 | Liu | 280/11 |

*Primary Examiner*—Robert R. Song
*Attorney, Agent, or Firm*—Fitch, Even & Tabin

[57] ABSTRACT

A shopping cart having wheels is also provided with an attachment having skis allowing the same to be pulled over snow or other soft surfaces. The attachment comprises a pair of skis movable between a sliding position and a stowed position whereby the shopping cart may travel over snow or sand.

1 Claim, 5 Drawing Figures

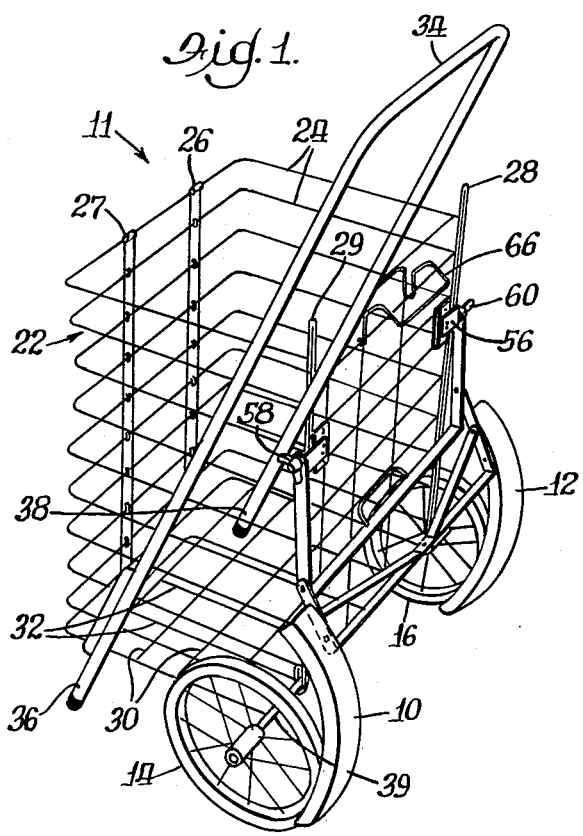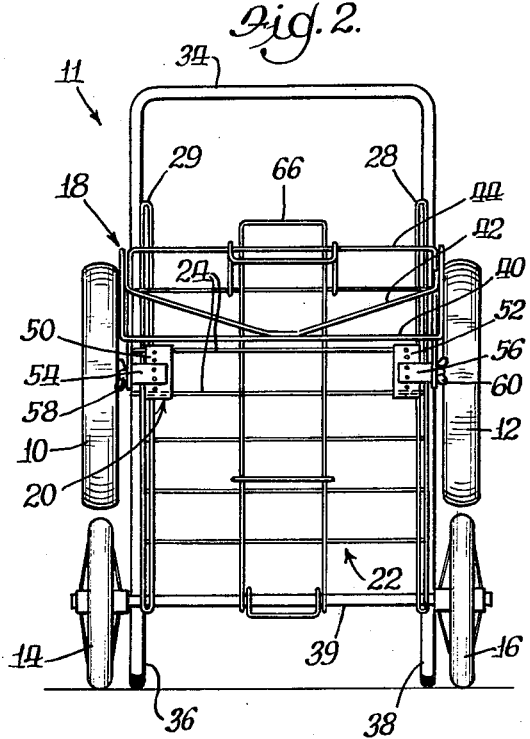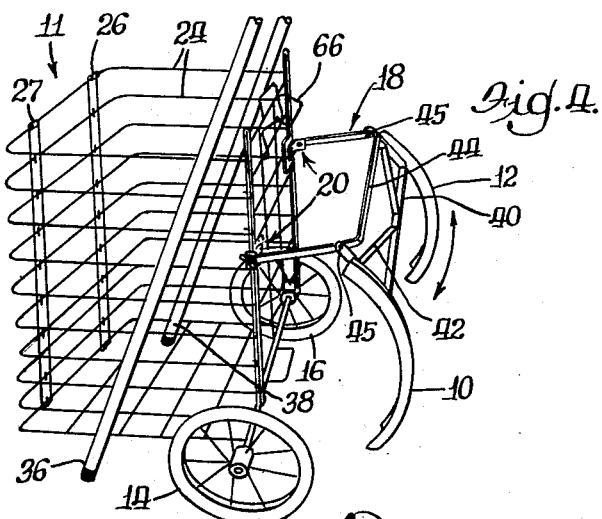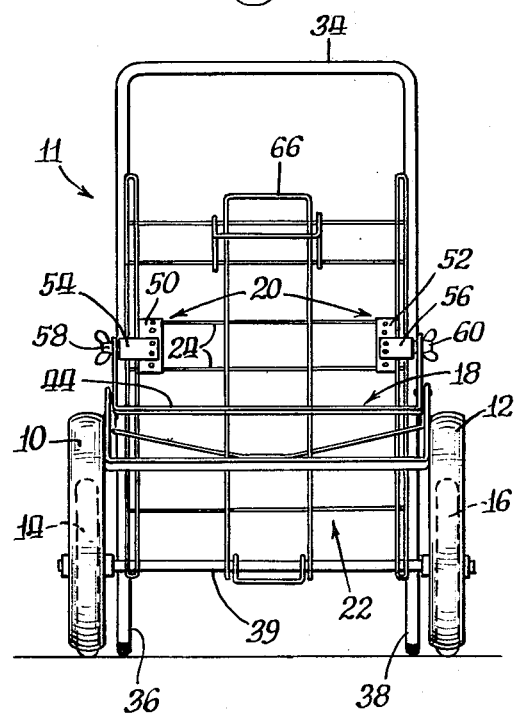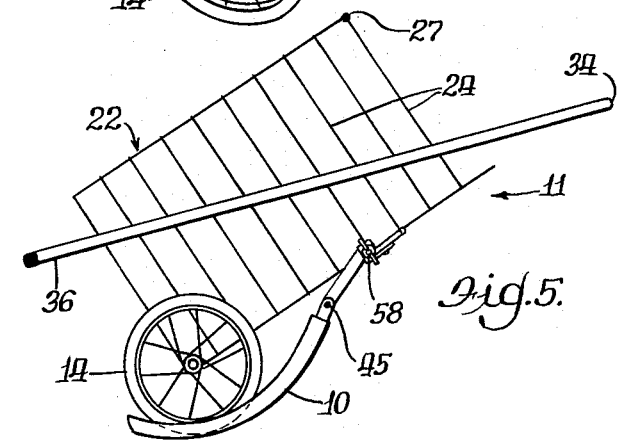

SHOPPING CART SKIS

The present invention relates to shopping carts and to attachments therefor.

Shopping carts generally have a basket for carrying the day's purchases and a handle by which the cart is pushed or pulled. In addition, shopping carts usually have at least two wheels on which the cart rolls. Therefore, the cart is mostly suitable for travel over relatively hard surfaces such as pavement or gravel.

During winter after a blanket of snow has fallen, shoppers often experience difficulties pulling or pushing shopping carts through the snow. This is due to a tendency of the wheels to sink into the snow. Similarly, people living in beach homes experience difficulties moving their shopping carts across sandy beaches. Thus there is a need for carts which have the capability of travel over hard surfaces on wheels and of travel over soft snowy or sandy surfaces on skis, skids, or the like. The present invention is directed to providing original equipment carts as well as existing carts with skis for travel over snow or sand.

A shopping cart having skis for travel over snow and the like should be inexpensive in order to be commercially successful because the usual shopping cart is not an expensive item itself. Furthermore, a shopping cart with skis should be lightweight since the cart is often used by women and children. The skis should also be capable of being easily stowed out of the way on the cart until they are needed even though they are relatively large, yet also be capable of being easily moved into position for sliding. In addition, an apparatus allowing a shopping cart to travel over snow should have the capability of being easily attached by present owners of shopping carts as well as being sold as original equipment on new shopping carts.

It is an object of the present invention to provide a shopping cart meeting, for practical purposes, the above-mentioned criteria, and, particularly, in a manner requiring a relatively uncomplicated mechanical arrangement.

It is a further object to provide a ski-carrying apparatus for attaching to a shopping cart meeting the above-mentioned criteria.

These and other objects of the invention are set forth in the following detailed description of which:

FIG. 1 is a perspective view of an embodiment of the present invention showing a shopping cart having a pair of skis in a sliding position;

FIG. 2 is a front view of the shopping cart of FIG. 1 showing the skis in a stowed position;

FIG. 3 is a front view of the shopping cart of FIG. 2 showing the skis in the sliding position;

FIG. 4 is a perspective view of the shopping cart showing the skis in a position between the stowed and sliding positions; and FIG. 5 is a side view of the shopping cart in a tilted position for pulling, with the skis in the sliding position.

With reference to FIGS. 1, 2, and 3, a shopping cart 11 embodying the present invention is shown generally comprising a pair of skis 10 and 12 for sliding on snow or ice, each ski being movable between a sliding position (FIGS. 1 and 3) under a wheel 14 (and 16 respectively) of said cart for sliding on the snow, and a stowed position (FIG. 2) in which the skis are at another location allowing the wheels to be operative. With reference to FIG. 4, the invention further comprises a carrier means 18 operatively connecting skis 10 and 12 for securing the skis relative to each other and mounting means 20 for mounting skis 10 and 12 and carrier means 18 to cart 11 such that said skis may be moved between said stowed and sliding positions.

Referring now to FIG. 1, in a specific construction of the invention, cart 11 has a basket 22 having sides and a bottom defining a receptacle for articles. The sides of basket 22 are comprised of a plurality of parallel wires 24 bent to form an enclosure and secured by crossbraces 26–29. The floor of basket 22 is comprised of a first plurality of wires 30 crosshatched with a second plurality of wires 32, both of which are attached to the bottom wire of the plurality of wires 24. Cart 11 includes a handle 34 defined by a U-shaped bar secured to the sides of basket 22 for pushing or pulling cart 11. Handle 34 also has feet 36 and 38 by which cart 11 may stand in an upright position. Wheels 14 and 16 have an axle 39 connected therebetween supporting basket 22.

Referring now to FIG. 4, carrier means 18 for securing skis 10 and 12 relative to each other comprises a first brace extending transversely between skis 10 and 12 and joined at opposite ends to skis 10 and 12. The brace includes a first rigid U-shaped member 40 having two end portions and a center portion therebetween which carries a V-shaped member 42 attached to the inside of the center and end portions of member 40. Skis 10 and 12 are attached to the outside of the two end portions of member 40, respectively. Carrier means 18 further comprises a second brace pivotally jointed to the first brace. The second brace includes a second rigid U-shaped member 44 having two end portions and a center portion. The center portion of member 44 is of a length such that the outside of the end portions of member 44 may fit within the inside of the end portions of member 40. The two end portions of member 40 are pivotally joined by pivot pins 45 to the bases of the two end portions of member 44, respectively, so that members 40 and 44 may fold together.

With reference to FIGS. 2 and 3, mounting means 20 mounts skis 10 and 12 and carrier means 18 to cart 11 such that skis 10 and 12 may be moved from a sliding position (FIG. 3) to a stowed position (FIG. 2). Mounting means 20 further allows skis 10 and 12 and carrier means 18 to be sold separately from cart 11 and attached by the owner. Mounting means 20 includes a pair of clamps 50 and 52 which are clamped to two of the plurality of wires 24 on the front side of basket 22. Clamps 50 and 52 carry a pair of brackets 54 and 56, respectively, each of said brackets having a hole. Carrier means 18 is pivotally connected to brackets 54 and 56 by means of wing nuts and bolts 58 and 60. Bolt 58 passes through the hole in bracket 54 and a hole in one end portion of member 44 of carrier means 18 and is secured with wing nut 58. The other end portion of member 44 is similarly pivotally connected to bracket 56 by means of bolt and wing nut 60.

Cart 11 also includes a securing means for securing the skis in the stowed position when not in use (FIG. 2), but such that they are readily releasable when needed. In the preferred embodiment, the securing means comprises a hooking means 66 connected to the front side of cart 11. Hooking means 66 is inexpensively made and is defined by a wire bent into the shape of two parallel connected hooks as shown in FIG. 1.

Skis 10 and 12 may be moved into a stowed position by pivoting member 44 of carrier means 18 up until the center portion of member 44 engages hooking means 66.

Skis 10 and 12 and members 40 and 42 of carrier means 18 may then fold down from member 44 to assume the stowed position as shown in FIG. 2.

When it is desired to move the cart over snow or sand, skis 10 and 12 may be moved into the sliding position (FIG. 3) by releasing carrier means 18 from hooking means 66. The center portion of member 44 of carrier means 18 is released from hooking means 66 which allows carrier means 18 and skis 10 and 12 to pivot downward with skis 10 and 12 extending outward as shown in FIG. 4.

Herein, the interior surfaces of the skis are curved and tires on the wheels fit therein with the load being transferred from the cart wheels 14 and 16 through the skis to the snow surface. The skis exert a tensile loading through the carrier means 18 and mounting means 20. The skis need not be rigidly braced when they are aligned with the wheels and have the wheels set therein.

FIG. 3 shows skis 10 and 12 and carrier means 18 fully extended and pivoted downward with skis 10 and 12 ready for sliding. FIG. 5 shows cart 11 tilted forward ready to be pulled by means of handle 34 with the weight of cart 11 resting principally on ski 10 (and ski 12 not shown).

When the skis are no longer necessary for any length of time, skis 10 and 12 and carrier means 18 may be easily removed by removing wing nuts and bolts 58 and 60 from brackets 54 and 56, respectively. However, with the skis in the stowed position, it is not necessary to remove them.

Herein, the skis 10 and 12 are shown with a generally arcuate shape although other and more conventional flat ski shapes may be used. The illustrated skis are made of metal, but plastic or other materials may be used. The particular shape of the ski and the material used therefor may be varied and still fall within the purview of the invention.

It will, of course, be understood that modifications of the present invention, in its various aspects, will be apparent to those skilled in the art, some being apparent only after study, and others being merely matters of routine mechanical design. As such, the scope of the invention should not be limited by the particular embodiment and specific construction herein described, but should be defined only by the appended claims and equivalents thereof.

Various features of the invention are set forth in the following claims.

What is claimed is:

1. A grocery cart for traveling on snowy or dry surfaces comprising:

a frame having a basket which has sides defining a receptacle for articles and a pair of wheels on said frame for rolling along a dry surface;

a pair of skis each movable from a stowed position adjacent a side of said cart to a sliding position under a wheel of said cart for sliding along a snowy surface;

each of said skis being located in a position above and in a plane aligned with its associated wheel and located along the sides of the basket when the skis are in the stowed position;

a carrier means interconnecting said skis at the upper ends thereof and including a brace means extending transversely between and joined to each of said skis adjacent an upper end thereof, the lower ends of said skis being free unconnected ends;

said skis each having inner curved surfaces for contacting curved surfaces of an associated wheel;

a mounting means for pivotally connecting said carrier means to said frame;

said carrier means including an articulating means pivotally connected at one end to said mounting means and pivotally connected at another end to said brace means, said articulating means being pivotal to an upward stowing position in which said another end is raised and located adjacent the rear side of said basket and to a lower position in which said another end is swung downwardly below said one end to position said skis in said sliding position, the free end of said skis engaging said wheels in said sliding position, means operatively connected to said cart for securing said another end of said skis in said stowed position until it is desired to move them to said sliding position.

* * * * *